United States Patent [19]

Tanimoto

[11] Patent Number: 5,893,898
[45] Date of Patent: Apr. 13, 1999

[54] NAVIGATION SYSTEM HAVING INTERSECTION ROUTING USING A ROAD SEGMENT BASED DATABASE

[75] Inventor: Satoshi Tanimoto, Irvine, Calif.

[73] Assignee: Alpine Electronics, Inc., Tokyo, Japan

[21] Appl. No.: 08/692,896

[22] Filed: Jul. 30, 1996

[51] Int. Cl.[6] .................................................. G01C 21/00
[52] U.S. Cl. ........................... 701/201; 701/209; 701/211
[58] Field of Search ................................. 701/201, 208, 701/209, 210, 211; 340/995

[56] References Cited

U.S. PATENT DOCUMENTS

| | | | |
|---|---|---|---|
| 4,675,676 | 6/1987 | Takanabe et al. | 340/995 |
| 4,914,605 | 4/1990 | Loughmiller, Jr. et al. | 364/518 |
| 4,926,336 | 5/1990 | Yamada | 364/444 |
| 5,041,983 | 8/1991 | Nakahara et al. | 364/449 |
| 5,270,937 | 12/1993 | Link et al. | 364/449 |
| 5,307,278 | 4/1994 | Hermans et al. | 364/450 |
| 5,371,678 | 12/1994 | Nomura | 364/444 |
| 5,377,113 | 12/1994 | Shibazaki et al. | 364/449 |
| 5,410,485 | 4/1995 | Ichikawa | 364/444 |
| 5,508,930 | 4/1996 | Smith, Jr. | 364/444 |
| 5,519,619 | 5/1996 | Seda | 364/444 |
| 5,729,458 | 3/1998 | Poppen | 364/464.1 |

FOREIGN PATENT DOCUMENTS

| | | |
|---|---|---|
| 1-173298 | 7/1989 | Japan . |
| 2-260000 | 10/1990 | Japan . |
| 6-25909 | 4/1994 | Japan . |

*Primary Examiner*—Michael Zanelli
*Attorney, Agent, or Firm*—Brinks Hofer Gilson & Lione

[57] ABSTRACT

A route searching system for a vehicle navigation system for navigating on a road network, for use when the road network database is organized in terms of road segments and the destination is a road intersection. The destination road segment for a particular guided route is selected so that the destination road segment is accessible from the destination intersection. This is of benefit when the destination road segment is one permitting only one way travel, and thereby avoids selecting as the destination road segment a one way road permitting travel only into the destination intersection. This allows selection of an optimum route without dictating that the route pass through a one way segment leading only into the destination intersection. Another improvement is destination road segment filtering, whereby if a destination road segment is chosen such that travel on it is zero distance, then that destination road segment is deleted from the guided route, and instead the end of the previous road segment on the guided route is indicated as being the destination. This eliminates unnecessary instructions being given to the driver when he arrives at the destination intersection.

20 Claims, 10 Drawing Sheets

Road Name in California

| |
|---|
| ⋮ |
| Airport Blvd. |
| ⋮ |
| Broadway Ave |
| ⋮ |
| Road 1 |
| Road 2 |
| ⋮ |
| Zoo road |
| ⋮ |

Road Data

| |
|---|
| Road 2 |
| ⋮ |
| Seg 1 |
| Seg 3 |
| ⋮ |

Segment data

| |
|---|
| Seg 1 |
| NDPT 11 |
| NDPT 12 |
| Only right |
| Segment length = 4 miles |

FIG. 4

NAVIGATION SYSTEM HAVING INTERSECTION ROUTING USING A ROAD SEGMENT BASED DATABASE

BACKGROUND

1. Field of the Invention

This invention pertains to navigation systems and more particularly to a vehicle navigation system for selecting a route on roads and highways and even more particularly to routing to a destination at an intersection of two roads using a road segment based database.

2. Description of the Prior Art

Vehicle navigation systems are well known; see Yamada, U.S. Pat. No. 4,926,336 incorporated herein by reference disclosing a route searching system using a database describing road information including road intersections. See also Link et al. U.S. Pat. No. 5,270,937, incorporated herein by reference, disclosing a vehicle navigation/position system which searches road segments stored in a road map data memory for determining vehicle position in respect to roadway map coordinates.

Vehicle navigation systems require that road information be stored in a database. The road information is often in the form of road segments, where a road segment is a length of a road between two nodes. Typically a node is an intersection with another road or with an artificial boundary such as a state boundary. The information stored in the database describes each road in a particular geographical area for purposes of. route guidance and display of a map showing the roads.

Two main formats are used for storage of road information in the database. The first format, typically favored in the United States for instance, is road segment based database. In this case the information pertains to the road segments.

The other format is an intersection (node) based database where the emphasis of the stored information is on the nodes (intersections) themselves and the roads are defined as the connections between nodes. It is not unusual that for a particular geographic area only one type of database is available. This is often because such databases are provided by third party commercial services and it is sometimes not economically feasible to provide both types of databases for a particular geographical area. An example of a node based database for a navigation system is disclosed in Ichikawa U.S. Pat. No. 5,410,485 assigned to Alpine Electronics Inc., incorporated herein by reference; see FIG. 20. An example of a segment based database for a navigation system is disclosed in Loughmiller, Jr. et al. U.S. Pat. No. 4,914,605 assigned to ETAK Inc., incorporated herein by reference, see column 12 line 46 and following and FIG. 6A.

Hence it is not unusual for a navigation system to be required to operate with a database which is segment oriented. Such a navigation system in most cases operates satisfactorily; however the present inventor has determined that in certain circumstances suboptimum performance is provided when the destination is at a road intersection.

SUMMARY

The present inventor has found a first shortcoming of a routing process implemented in a navigation system having a segment based road database, where the destination is at a road intersection. Since the data is stored in road segment form, the destination by definition has to lie on a particular road segment (e.g., at the end of a road segment) and not at the intersection which is defined as the ends of two road segments. This is because intersections per se are not recognized by the database.

This has been found to present a problem where a road intersection is an intersection of several road segments, at least one of which allows only one way vehicular traffic into the road intersection. In this case if that particular one way road segment is chosen as the destination road segment for route guidance purposes, this dictates the routing to the destination intersection as invariably passing along that one way road segment. This may result in a sub-optimum route selection, i.e. a longer than necessary route. This is because the destination road segment, being one way into the intersection, is not accessible from the destination intersection.

A second problem also occurs when the destination is an intersection. In this case it is possible that the navigation system, in routing the user to the destination intersection, will choose as the destination road segment a road segment other than that on which the driver is actually approaching the intersection. In this case, the route guidance will thereupon only indicate that the driver has arrived at his destination when he has actually already reached the intersection, and perhaps travelled a slight distance onto the last (destination) road segment. This therefore results in unnecessary maneuvering by the driver, i.e. it may force him to drive through the destination intersection when he actually wants to be at the intersection. In other words, the system will indicate that the driving distance on the destination road segment is zero, and will not tell the user that this means that the intersection itself need not be traversed.

Recognition and explicit stating of these shortcomings leads to the solutions. In the first problem of the destination segment being a one way road segment, in the solution the route selection only selects as the destination road segment a road segment that is accessible from the destination intersection, i.e. a road segment that allows travel away from the destination intersection. This can be either a road segment allowing one way travel away from the destination intersection or a road segment allowing two way travel to and from the destination intersection. However, the system excludes as a destination road segment any road segment which only allows travel to the destination intersection. In other words, the system excludes as being the destination road segment any road segment which while terminating at the destination intersection is not accessible from the destination intersection. It is to be understood that this method does not prevent the optimum route from being along the problematic one way road segment to the destination segment; it only requires that the system not use the one way road segment as the destination segment for purposes of choosing a route.

The second problem, of travel on a destination road segment with the travel being a distance of zero, is addressed in accordance with this invention by determining if the travel distance (on the guided route) on the destination road segment is in fact zero. If so, that destination road segment is excluded from the guided route, i.e. is deleted from the guide route solution list.

These two solutions simplify route guidance, provide clearer route guidance to the user of the navigation system, and reduce user confusion hence making the navigation system more useful.

3

Figure 3:
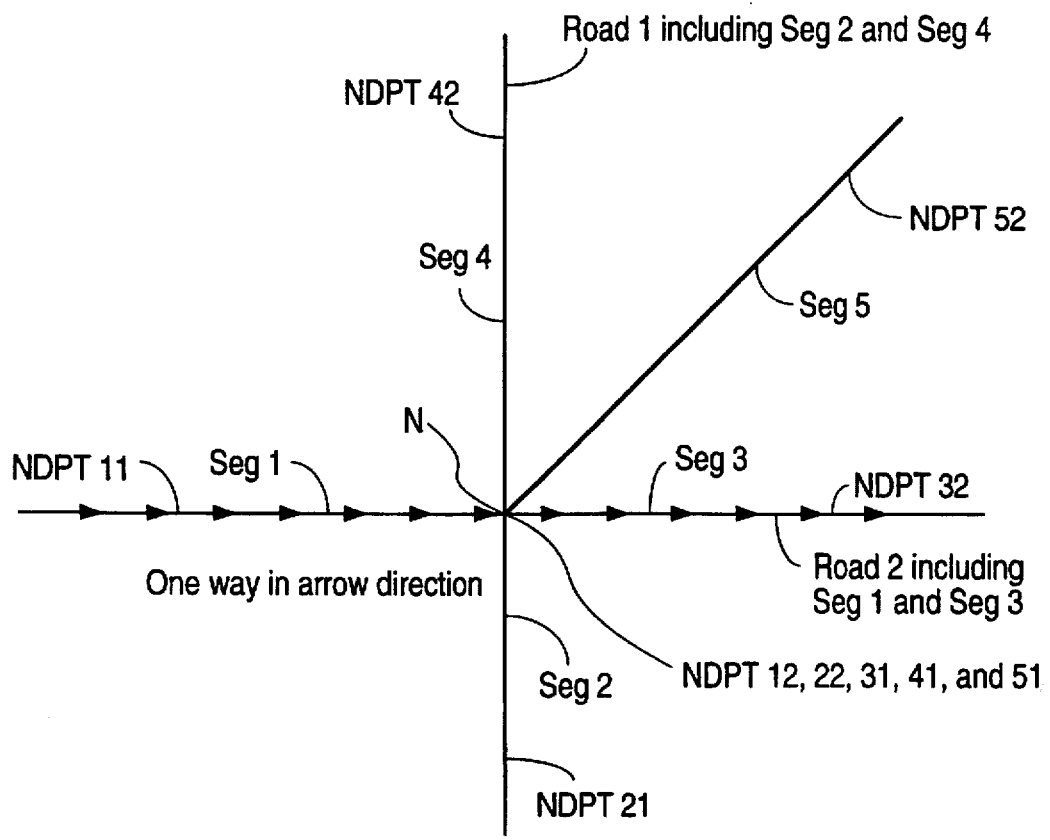

FIG. 3 illustrates graphically both a problem and the solution in accordance with this invention to destination segment selection.

FIG. 4 shows organization of a segment based database in accordance with FIG. 3.

Figures 5, 6:
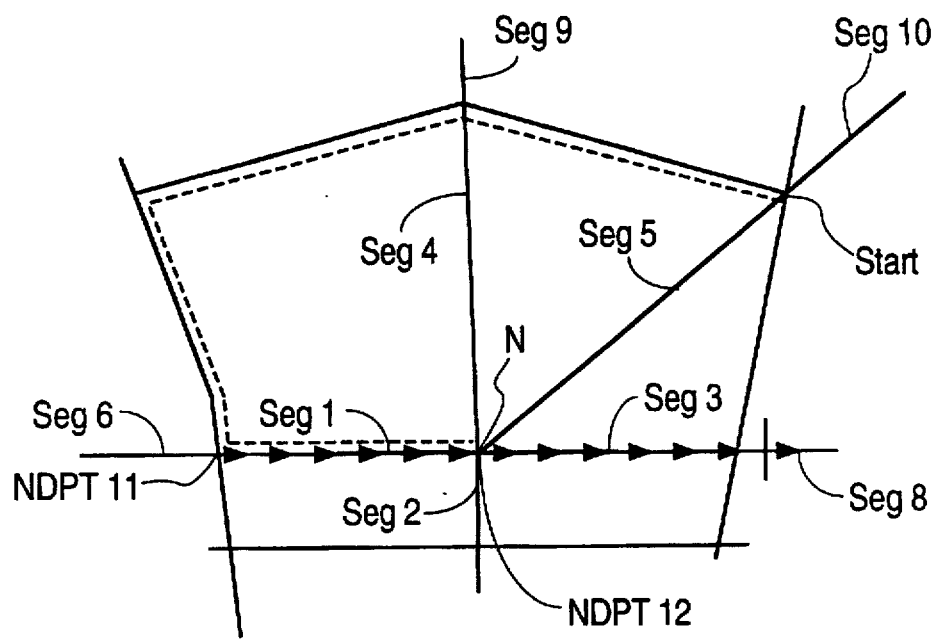

FIG. 5 shows additional detail of the diagram of FIG. 3.

FIG. 6 shows a segment data list in accordance with FIG. 5, illustrating a deficiency in prior art navigation systems.

Figure 7A:
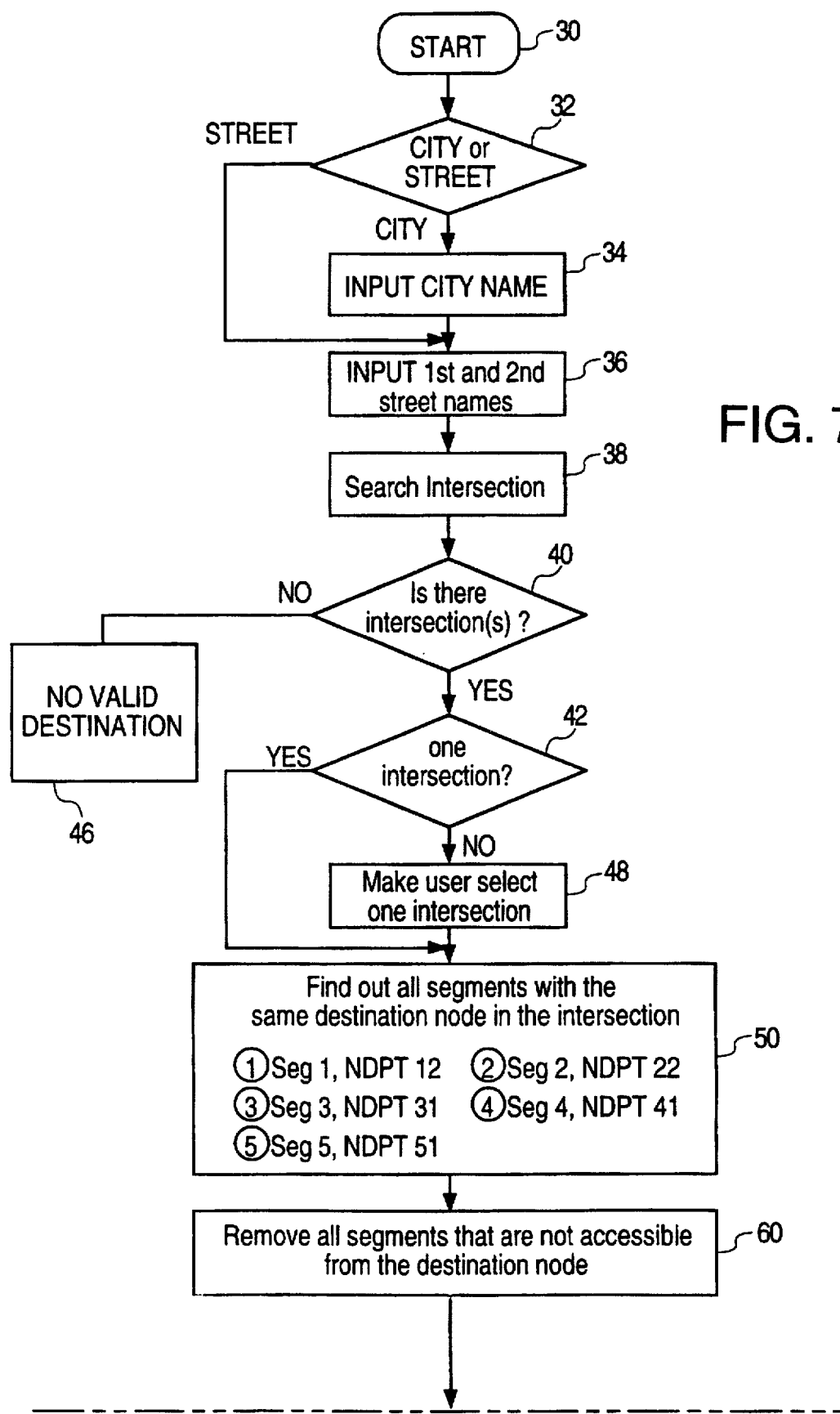
Figure 7B:
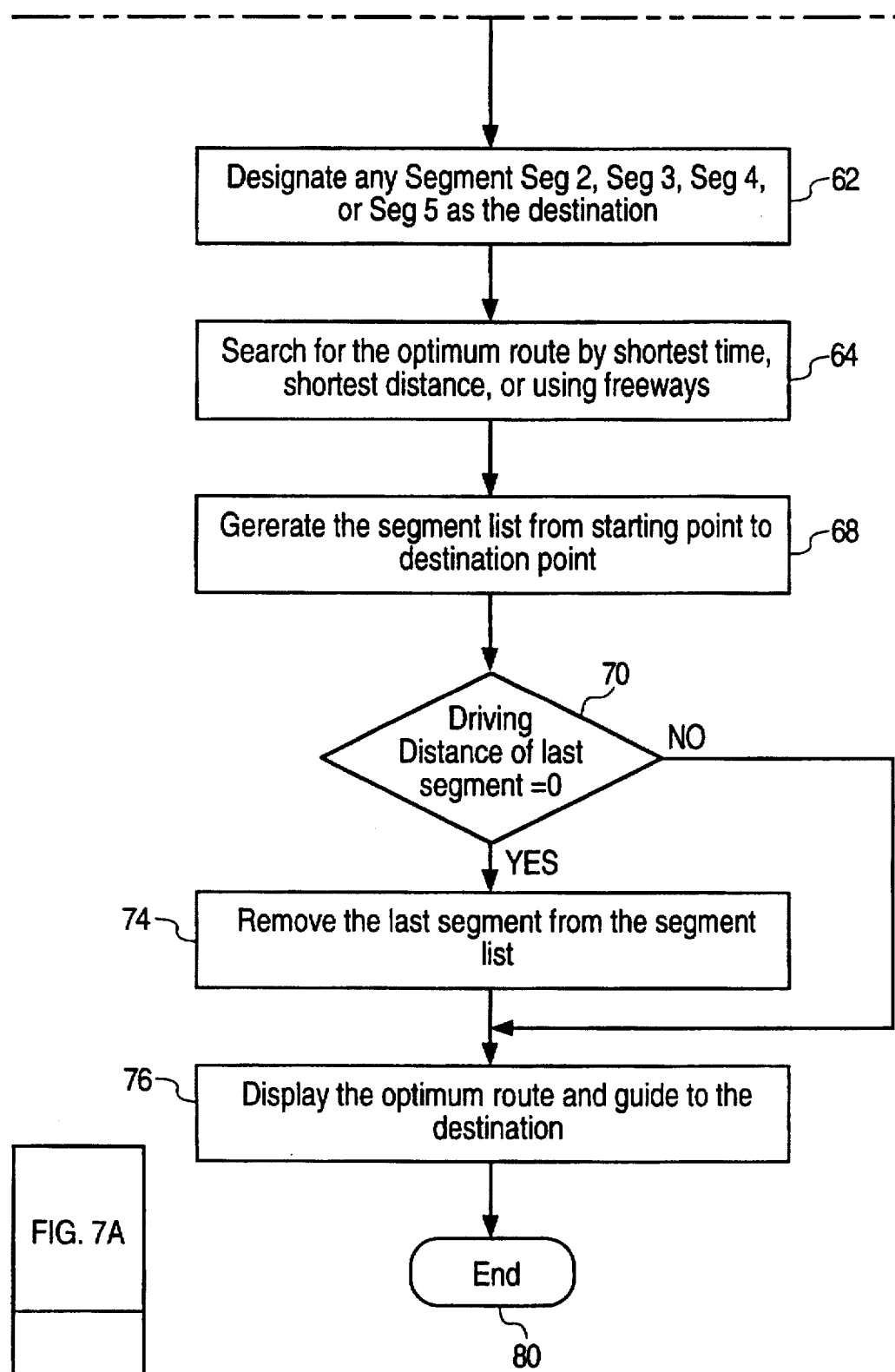

FIGS. 7A, 7B, when arranged as shown in FIG. 7, are a flowchart of a computer program for both road segment selection and deletion of unneeded road segments from a guided route.

Figure 8:
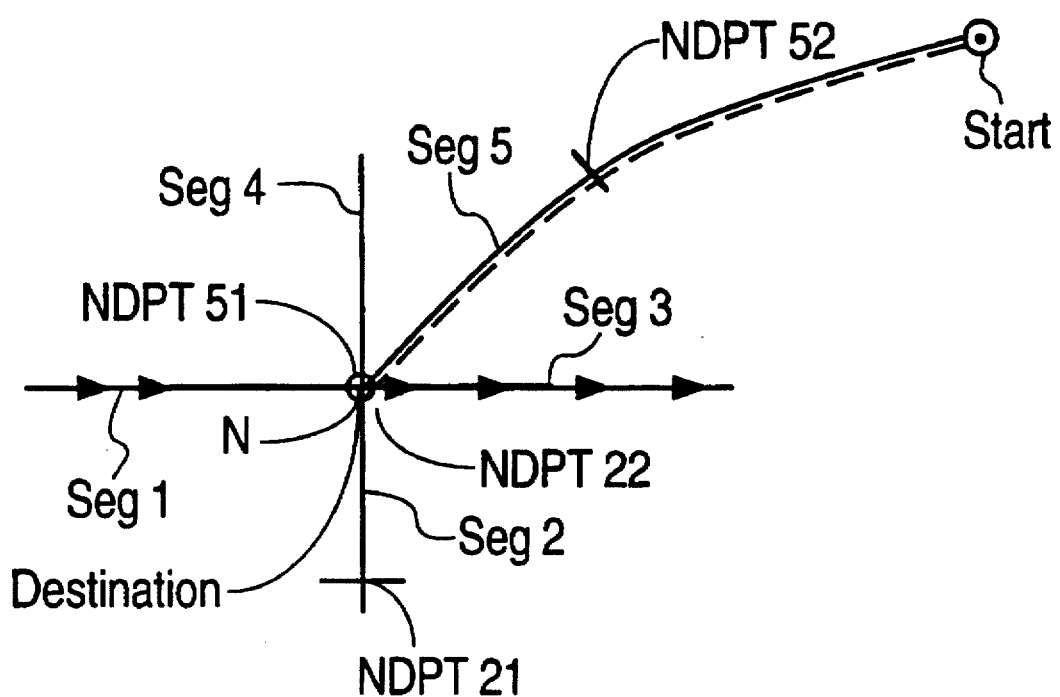

FIG. 8 shows graphically a first example illustrating application of the present invention.

Figure 9:
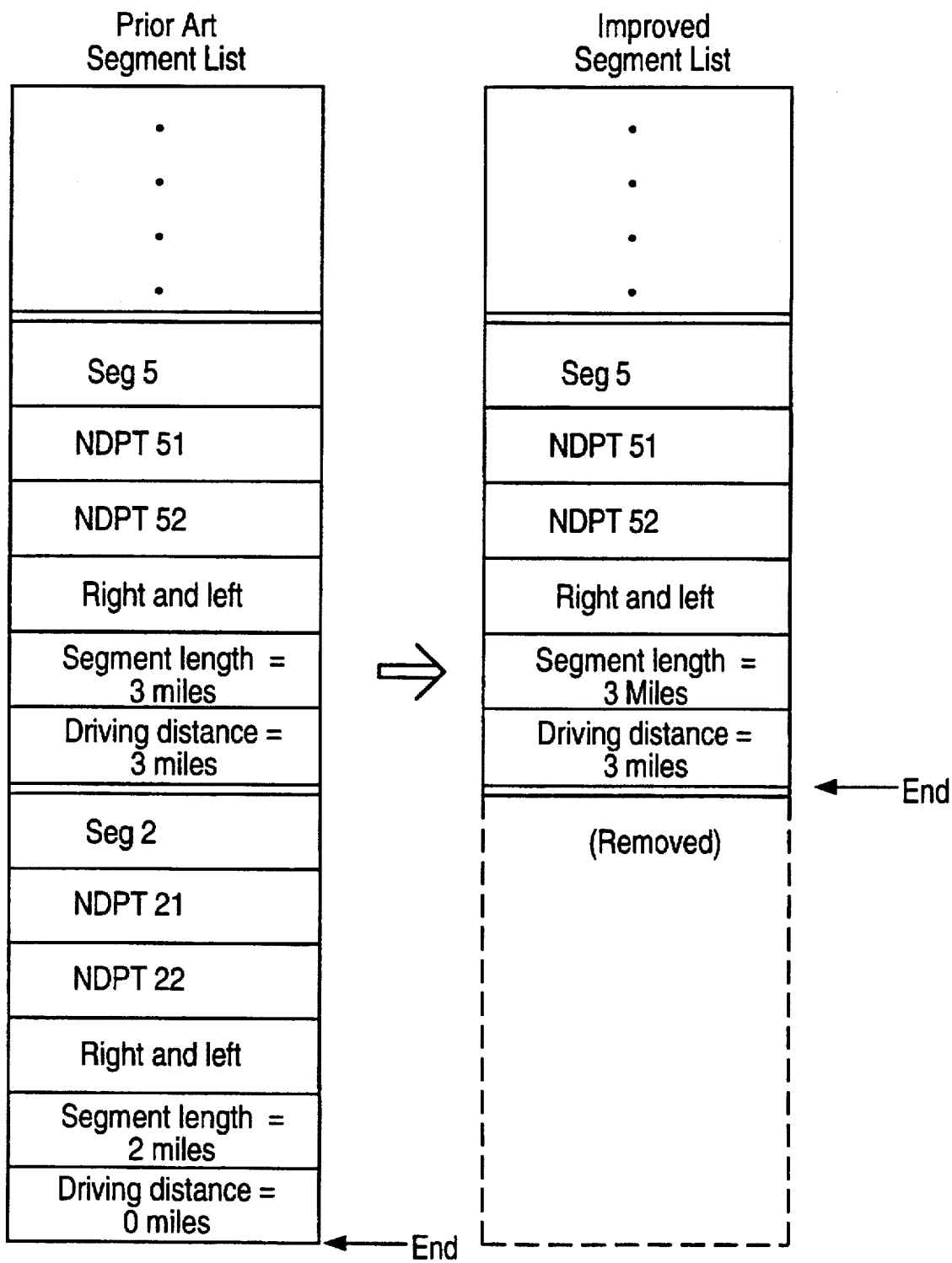

FIG. 9 shows a prior art road segment list and a road segment list in accordance with this invention for the example of FIG. 8.

Figure 10:
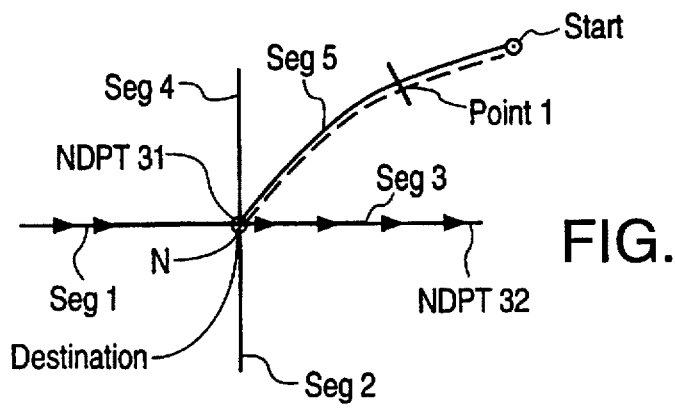

FIG. 10 shows graphically a second example.

Figure 11:
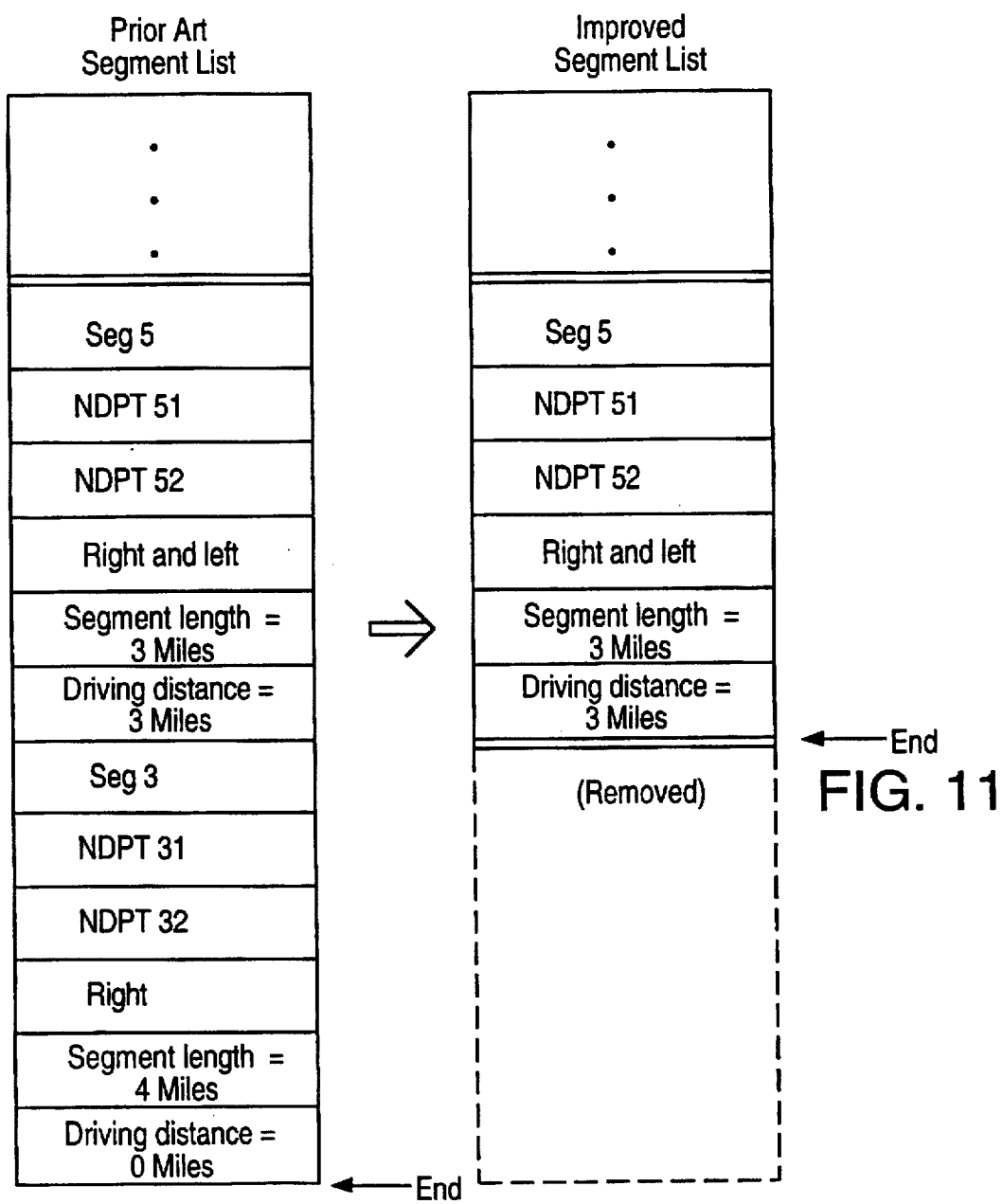

FIG. 11 shows a prior art road segment list and a road segment list in accordance with this invention for the example of FIG. 10.

Figure 12:
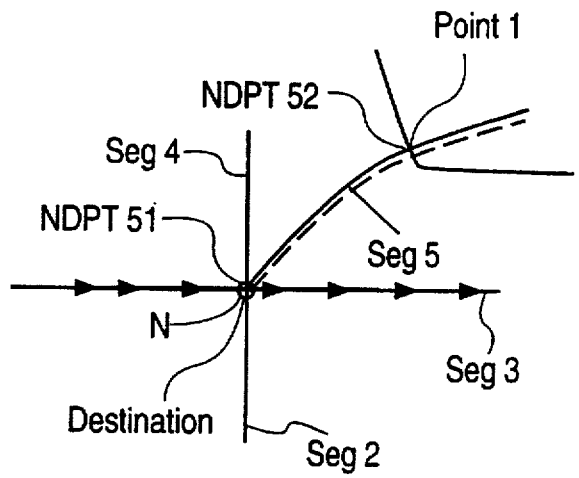

FIG. 12 shows graphically a third example.

Figure 13:
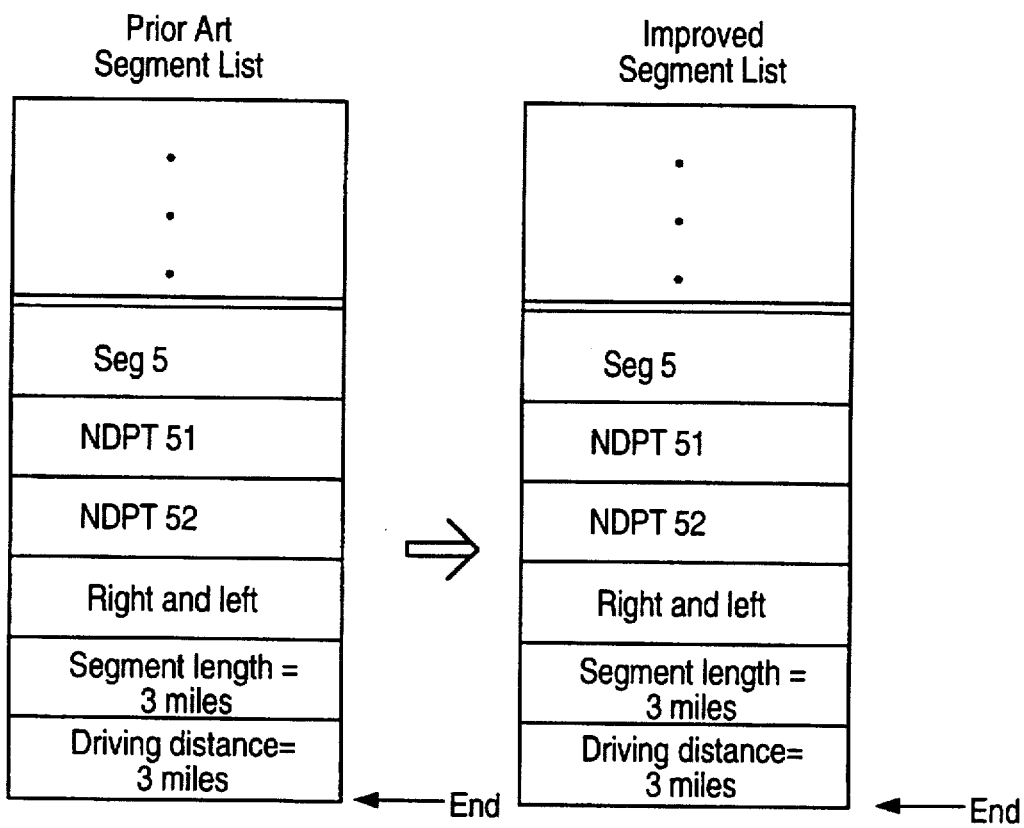

FIG. 13 shown a prior art road segment list and road segment list in accordance with this invention for the example of FIG. 12.

DETAILED DESCRIPTION

Figure 1:
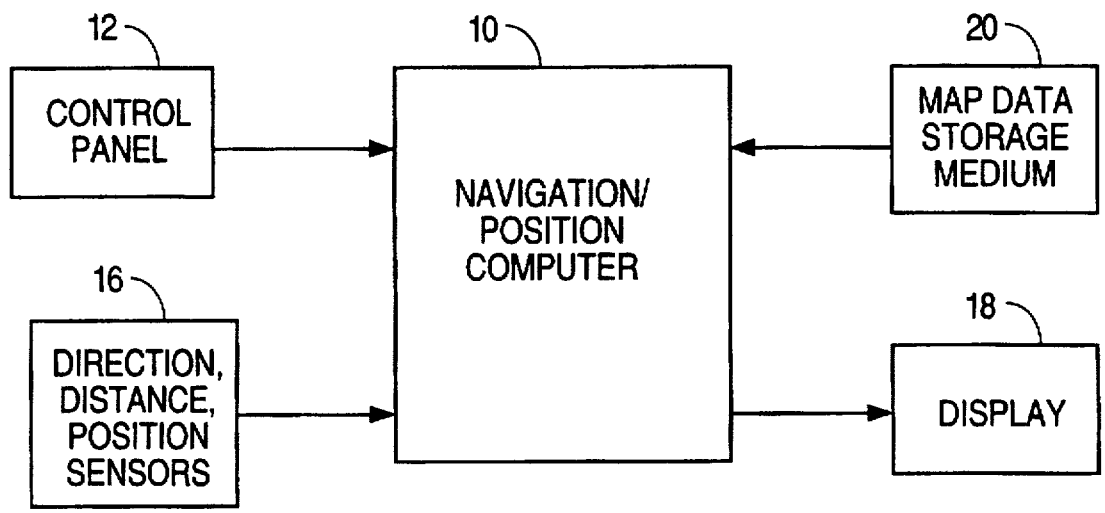
FIG. 1 shows a block diagram of a navigation system.

FIG. 1 shows in a simple diagram of a navigation system used in accordance with this invention, and of the type shown for instance in U.S. Pat. No. 5,270,937 to Link et al. This is merely intended to be illustrative of such systems; various versions of such navigation systems are well known in the art and the present invention is generally applicable to them for purposes of route determination, i.e. route guidance. It is understood that such navigation systems have two main interrelated functions; the first is to display for the user a map of the present vehicle location, and the second is to provide guidance on a route from a starting point to a destination. The second function is generally referred to as route guidance or selection. A route is typically optimized for one of various parameters, for instance minimum travel time, minimum travel distance, maximum use of freeways, or other parameters pertaining to movement of a vehicle on a road network.

The system of FIG. 1 includes as a central element the navigation/position computer 10 which is typically a microprocessor and associated circuitry including random access memory, input/output circuitry etc., to which is connected a user control panel 12 installed in the vehicle; and a set of distance, direction, and position sensors 16 such as a GPS system, a gyroscope, and the vehicle odometer/speedometer. Also provided is a map data storage medium 20 which is typically a hard disk drive, or optical disk drive, other type of non volatile computer readable memory, and a display 18 for the user. Display 18 may include a loudspeaker.

The navigation/position computer 10 operates by means of a computer program, e.g. computer software, resident therein and executed as a series of instructions by the microprocessor and/or microcontroller which is a part of the navigation/position computer 10. It is to be appreciated that the methods and apparatus in accordance with this invention are embodied in such computer software. While the present disclosure does not show the actual computer code, such computer code can be written from this disclosure by one of ordinary skill in the art, and in an actual navigation system

4 would be in the form of a computer program which is stored in a computer-readable memory such as a random access memory, a read only memory, a hard disk drive, floppy disk, or an optical disk associated with computer 10 and may or may not be resident in storage medium 20.

Figure 2:
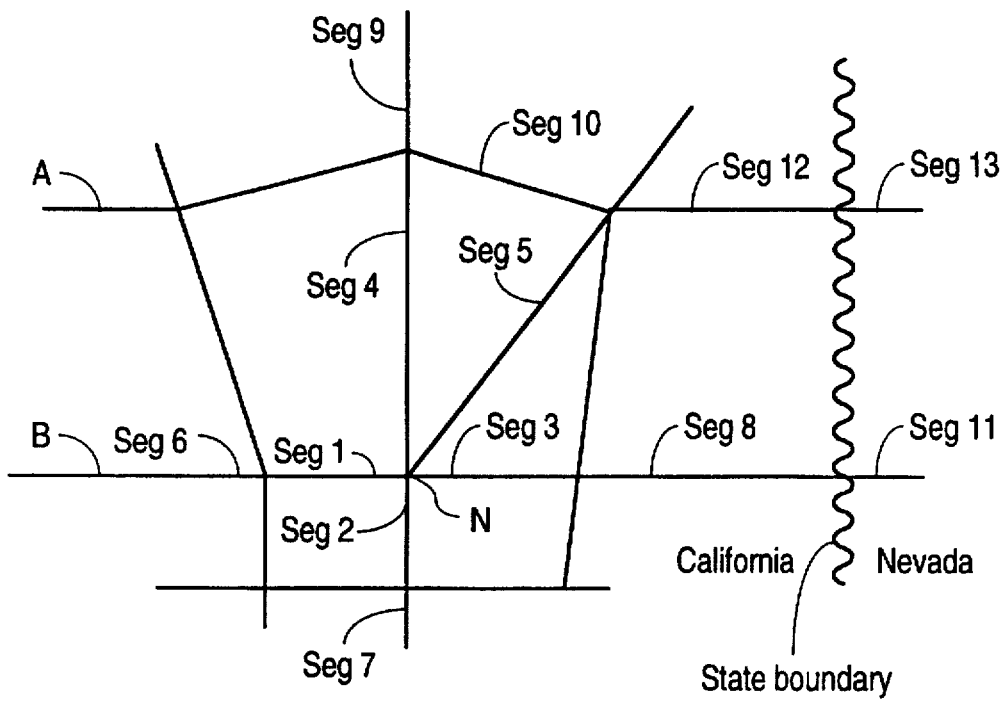
FIG. 2 shows graphically a road segment.

FIG. 2 shows what is meant by road segments. FIG. 2 shows a set of roads each as a line intersecting with other roads, each of the two horizontal roads A and B being respectively segments 10, 12, and 13; and segments 6, 1, 3, 8, and 11. Also shown is a state boundary, e.g. the boundary between California and Nevada, which is traversed by roads A and B. Since in this definition, a segment is a section of a road between two intersections or between an intersection and a political boundary, road A includes two segments 12 and 13 on either side of the state boundary. Further description of how a segment based database is organized is provided below.

It is to be appreciated that FIG. 2 defines roads A and B each as a series of linked road segments and not as a series of intersections linked by road segments. This is a difference between a road segment based database and an intersection based database.

FIG. 3 illustrates the first above described problem discovered by the present inventor and which is addressed by the present invention. The problem is that intersection type routing, i.e. routing of the vehicle to a destination which is an intersection, requires routing to a specific node point. This of course is not a problem when the intersection type routing is carried out using a map database which is an intersection based database. However the present invention is addressed to the situation where intersection type routing is carried out using road data which is in the form of segment based database.

In this case, at each intersection one must select one of the road segments connecting to that intersection for routing purposes as being the destination road segment. As shown in FIG. 3, the destination intersection N has connecting to it five road segments 1, 2, 3, 4, and 5. The arrows indicate that on road segment 1 only one way travel is permitted, i.e. into intersection N. On road segment 3 only one way travel is permitted, away from intersection N. The present inventor has determined that in this situation, using intersection type routing and using a road segment based database, the system should not choose road segment 1 as the destination road segment when the user wants to travel to as the destination intersection N.

It is to be understood that in the context of the road data, "one way" road segments are not limited to what is normally considered to be a one way street. A segment based database considers any portion of a road having a center line sufficiently far from a center line of the same road allowing travel on the opposite direction to be "one way" also. Therefore on a north/south freeway, the northbound lanes are considered to be a one way segment. For a divided road, e.g. a boulevard having a center strip, each side of the boulevard is considered to be a one-way segment. Even for a non-divided road permitting two way traffic, if the two sides of the road are sufficiently spaced apart, each side is considered to be one way. This is a result of the digitizing process by which the road information is obtained from aerial photos of the actual road network.

If the system were to chose segment 1 as the destination (final) road segment of the guided route, this fixes the approach to the destination intersection N from one direction, i.e. along road segment 1. This of course is because only one way travel is permitted along segment 1 into intersection N. Hence the problem is that in the context of intersection type routing using a segment based database, one may be directed along a non optimum route, i.e. routed a longer distance than necessary.

This problem is solved by selecting as the destination road segment a road segment which allows travel away from intersection N; this does not limit the possible approach road segment to the destination intersection N. In other words, segment 1 is not accessible from the destination intersection N and should not be chosen as the destination (final) road segment of the route when it is desired to reach intersection N. Hence FIG. 3 illustrates both the first problem discovered by the present inventor and also illustrates the solution, which is the selection as the destination segment any of segments 2, 3, 4, or 5.

This method and the associated apparatus are described in more detail hereinafter.

As can be seen in FIG. 3, intersection N corresponds to the node points NDPT 22, NDPT 12, NDPT 41, NDPT 31, and NDPT 51, which are the nodes at the ends of their respective road segments. That is to say, NDPT 22 is the end of segment 2 at intersection N. ("NDPT" refers to node point.) (Intersection N per se is not an entry in the database; it is merely a convenient way in this disclosure to identify this location.)

Hence there is one node designation associated with each road segment which terminates at intersection N. FIG. 3 shows that e.g. Road 1 includes road segments 2 and 4 and Road 2 includes road segments 1 and 3.

FIG. 4 shows in tabular form a representation of portions of a road segment based database corresponding to some of the elements shown in FIG. 3. The first column lists the road names in the database (in alphabetic order), in this case all roads in California (with most of the entries not shown for illustration purposes). Road 2, which is one of the roads in California, is defined by the data listed in the second column which is the road data. The first item in the road data column for Road 2 is the road name or designation ("Road"). This is typically the common name of the road, i.e. that assigned by the authorities. The remaining items listed in the road data column are conventionally the road segments which make up that road; each road usually includes a number of segments, each segment extending from one intersection to the next or to a state boundary. Road segment 1 in the road data column is defined by the data shown in the third column of FIG. 4, which is the data pertaining to segment 1 and illustrated in FIG. 4. In this case road segment 1 extends from node point NDPT 11 to node point NDPT 12, however the entries in the road segment data list are the actual longitude and latitude of each node point. The next entry in the road segment data list table is an indication of what direction of travel is permitted along the road segment, and the last element in the road segment data list is the length of that road segment expressed in this case in miles. ("Only right" in this list means travel is permitted only from NDPT 11 to NDPT 12, i.e. one way in that direction.)

FIG. 5 illustrates in more detail the same problem shown in FIG. 3, where the destination intersection N is on road segment 1 at its node NDPT 12. In this case again the only direction of travel permitted along road segments 1 and 3 is that indicated by the arrows. In this case, once road segment 1 is designated as the destination road segment, the only guided route allowed from the start to the destination intersection N must pass along segment 1, independent of where the start is. Hence the guided route, as shown by the broken line, is clearly a non optimum route in term of distance. In this case, in the prior art the road segment list for route guidance purposes (which is not part of the data base) is shown in FIG. 6 where the final entry in the road segment list as determined by the system is on segment 1 from NDPT 11 to NDPT 12, with only one way ("only right") travel permitted along segment 1, the road segment length is 1.5 miles, and the driving distance along road segment 1 is 1.5 miles, i.e. to node NDPT 12. (It is to be understood that the segment list in FIG. 6 omits for purposes of illustration the other road segments actually present therein.)

Clearly as described above this is an unsatisfactory route guidance solution since it results in a non optimum route.

Hence the present inventor has provided the solution as described above which is to choose any road segment other than road segment 1 as the road segment on which the destination lies.

A flowchart for a computer program to carry out route guidance in accordance with the present invention is shown in FIGS. 7A, 7B; this flow chart is illustrative and not limiting. Moreover it is to be understood that the general problem of route guidance is well known, with many different solutions, and that the entire route guidance process is not illustrated in FIGS. 7A, 7B but only those portions pertinent to the present disclosure. Thus the process illustrated in FIGS. 7A, 7B condenses many complicated but conventional steps; for instance, the actual searching for the optimum route and the displaying of the optimum route. Since these steps are well known in the art and there are many different ways to accomplish them, they are not described herein in detail.

The intersection routing process begins at the start, step 30. The user can select his destination by Intersection, Address, or POI (Point of interest). FIG. 7A assumes the user has already selected Intersection routing. At step 32 the system inquires e.g. via display 18 of the user, typically the driver of a vehicle, whether he wishes to indicate his destination as being a city or a street. (The present invention is not limited to vehicular systems but is most applicable thereto.) The user responds, via control panel 12, either city or street at step 34. If the user input is city at step 34, the user is requested to input the desired city name. At this point the search is narrowed to the indicated city; otherwise all cities in a particular state for instance are searched. Of course the extent of the search is dependent upon the geographic area is covered by the database in the map data storage medium 20. If street is selected at step 32, at step 36 the user is asked by the system to input the first and second streets which meet at the desired intersection, i.e. to designate the destination intersection. At this point the system at step 38 searches the database for such an intersection; if there is such an intersection the system determines this in step 40 and proceeds to step 42. If there is no such intersection of these two streets, the indication is given to the user on display 18 in step 46 that there is "no valid destination" and the user can start over again at step 30.

If the system determines that there is such an intersection, then in step 42 it determines if there is only one such intersection of the two named streets. If yes, next is step 50. If no in step 42, step 48 asks the user to select one intersection of the two streets from multiple occurrences thereof. This may happen for instance when the same street names occur multiple times in the database, designating different streets. Also if one skips the step of designating a city in step 34, one may be searching a database which covers numerous cities in which case a particular named intersection may be in different cities.

After step 48, at which point the user has indicated which particular intersection is of interest or the system determines there is only one such intersection, next is step 50. At step 50 the system has not yet determined which road segments are on the optimum route, i.e. the optimum route has not yet been searched for. Therefore at step 50 the system exhaustively searches for all road segments with a node (end point) which is at the destination intersection. Referring to FIG. 3, the intersection N which is the destination intersection has segments 1, 2, 3, 4, and 5 extending to the intersection N. Hence a destination road segment list would be compiled of segments 1, 2, 3, 4, 5 and their associated nodes located at intersection N in step 50.

Next at step 60, the actual destination segment selection process in accordance with the present invention takes place, in which the "undesirable" destination segment(s) are removed from the list compiled in step 50. As shown in step 60, this is accomplished by searching the destination road segment list compiled in step 50 for e.g. road segment 1, by determining that in fact node N is not accessible from road segment 1 due to the one way nature of segment 1 at intersection N. Hence in step 60, road segment 1 would be removed from the road segment destination list compiled in step 50.

The next step, which is complementary to step 60, is step 62 where any one of the remaining road segments on the destination road segment list, i.e. segments 2, 3, 4, or 5, is arbitrarily selected as the destination road segment.

Then in step 64 a conventional search for the optimum route takes place using a parameter such as the shortest travel time, shortest distance, maximizing use of freeways, or other conventional measures of efficient road travel. Of course, the searching in step 64 already has the destination road segment determined in step 62.

In step 68 the road segment list for route guidance is generated conventionally from the starting point to the destination road segment, i.e. the optimum route is chosen.

At step 70 the system determines if the driving distance on the destination (last) road segment of the optimum route is of length zero. If not, one proceeds to step 76 and the optimum route is displayed and the driver is conventionally guided to the destination.

If however the determination in step 70 is yes, then in accordance with the invention, the system recognizes that no travel is needed on this destination road segment and the destination road segment should be deleted from the road segment list in order to minimize any inefficiencies or confusion in driving. Hence in step 74, in accordance with the invention the system removes this (last) destination road segment having travel distance zero from the road segment list. Then execution proceeds to step 76 and is terminated finally in end step 80.

Hence steps 70 and 74 represent what is referred to herein as destination segment filtering or segment deletion. That is, to prevent any unnecessary maneuvering, i.e. turning due to route guidance, if the destination road segment has a travel distance of zero, it is "filtered out," i.e. deleted from the road segment list. For instance in the example of FIG. 3, where the destination road segment is road segment 3, if one approaches the destination intersection N on any of segments 1, 2, 4, or 5, the actual travel distance on the destination segment 3 is zero. Under these conditions, removing segment 3 from the road segment list prevents the user from driving through the intersection N before being told by the system that he is at his destination. Hence this second improvement simplifies route guidance and provides clearer route guidance to the user, by preventing any unnecessary actions being indicated to the user through the display 18 in terms of where he should go at the destination intersection. Note that use of the destination segment filtering does not require the destination segment selection described above, and vice-versa.

The destination segment filtering is accomplished in another embodiment by somewhat different steps than shown in steps 70 to 74 of FIG. 7B. In this other embodiment, the system first checks to determine what node points correspond to the destination intersection.

The road segment list is then searched to determine if any of these node points are only in the last entry of the road segment list. If that is the case, there is no need for destination segment filtering and execution proceeds to step 76. If however that is not the case, (e.g. the destination node points are in the second to last entry in the road segment list) the road segment list is truncated to delete its last entry, so that the first entry in the list including the destination is also the last entry on the list, and execution then proceeds to step 76.

FIGS. 8 and 9 illustrate a first example in accordance with this invention directed to steps 70 and 74 of FIG. 7B.

In accordance with the invention, steps 60 to 64 of FIGS. 7A, 7B are executed and as a result in this example road segment 2 is designated as the destination road segment, and the optimum route lies along segment 5, as illustrated graphically in FIG. 8 where again the broken line is the optimum route. Although in this case road segment 2 is chosen as the destination road segment, since the destination is intersection N, no actual travel is needed along road segment 2, i.e. the travel distance along the destination road segment 2 is determined to be zero. This therefore illustrates the problem described above with prior art navigation systems whereupon the vehicle would enter road segment 2 (or at least reach intersection N) before the guidance indication would be provided to the user of "arrived at destination".

This of course is undesirable because entering road segment 2 may mean that the vehicle has already passed through the intersection N, when the user does not want to do that. In accordance with the invention, instead after the vehicle has driven 3 miles along segment 5 (and so is just at intersection N), the guidance indication is given to the user "arrived at destination". This occurs e.g. just prior to entering the intersection N or just upon entering it, rather than upon having exited it. This then is an example of the process shown in FIG. 7B steps 70 and 74.

This process is illustrated in terms of route guidance road segment lists in FIG. 9. The left-hand column of FIG. 9 illustrates what occurs in the prior art in terms of the road segment list, where the final portion of the segment list includes road segment 5, followed by the pertinent data, followed by road segment 2, followed by the pertinent data, where the driving distance on road segment 2 is zero.

In accordance with steps 70 and 74 of FIG. 7B, the system determines that since the driving distance on road segment 2 is zero, road segment 2 should be deleted from the list. This deletion may also be made using the alternative segment deletion method described above. The result is illustrated in the right-hand column of FIG. 9 showing the same road segment list as in the prior art, but with all data pertaining to segment 2 deleted. Hence the end of the route is indicated once one has driven three miles on segment 5, i.e. just reached the intersection N. Conversely, in some systems in accordance with the invention, the indication would be given in another fashion, for instance at NDPT 52, the display would indicate and/or an audible announcement made "next intersection is destination".

A second example under slightly different circumstances is illustrated in FIGS. 10 and 11. In this case in steps 60 to 64 of FIGS. 7A, 7B road segment 3 is designated as the destination road segment and the optimum route (broken line) is along segment 5, as shown graphically in FIG. 10.

The associated road segment route guidance lists for the prior art and in accordance with the invention are shown in FIG. 11, where the prior art segment list is the left-hand column of FIG. 11. With this prior art road segment list, the vehicle must travel along segment 5 and then turn left into segment 3; however the driving distance on segment 3 is zero miles since again the destination point is intersection N. Thus in the prior art, after the vehicle passes point 1 shown in FIG. 10, the system would instruct the driver e.g. via the display to make a "left turn at the next intersection." After the vehicle enters into road segment 3 by turning left at node point NDPT 31, as instructed, only then the indication would be given "arrived at destination". Hence this requires the driver to make a left turn at intersection N even though his destination is actually intersection N itself. Thus this requires an extra maneuver (a left turn) in terms of driving if the driver literally follows the route guidance instructions.

In accordance with the invention, in the road segment list, data pertaining to road segment 3 is deleted from the road segment list and the destination indication is given once the vehicle has entered road segment 5, the indication being "next intersection is the destination". The associated road segment list is shown in the right-hand column of FIG. 11.

A third example is shown in FIGS. 12 and 13. In this case in steps 60–64 of FIGS. 7A, 7B, road segment 5 is designated as the destination road segment and the optimum route (broken line) also is along road segment 5.

The corresponding road segment lists are shown in FIG. 13. As shown, in this case both in the prior art and in accordance with this invention, the last entry in the road segment list pertains to road segment 5 indicating a driving distance of 3 miles. Hence after passing point 1 shown in FIG. 12, the indication is given to the user "next intersection is the destination". In this case the same indication is given in the prior art and in accordance with this invention. However this is the only case when this is the situation, and in other cases, as illustrated above, there is an improvement due to the destination segment filtering.

This disclosure is illustrative and not limiting; modifications will be apparent to one skilled in the art and are intended to fall within the scope of the appened claims.

I claim:

1. A method for routing to a destination, based on stored information about a network of roads, each road including one or more road segments, comprising the steps of:

designating an intersection of at least two of the roads as the destination;

determining a starting location;

finding all of the road segments that connect to the designated intersection;

excluding from the found road segments any road segment not accessible from the designated intersection;

designating one of the remaining found road segments to be the destination road segment; and searching for a route on the network of road segments from the starting location to the destination road segment, the route thereby being an ordered set of the road segments; and indicating the route.

2. The method of claim 1, wherein the stored information includes information as to whether any road segment is a one-way road segment, and wherein the step of excluding includes the steps of excluding any road segments that are one-way road segments on which travel is only permitted one way towards the designated intersection.

3. The method of claim 1, wherein the step of searching includes selecting an optimum route in terms of a parameter based on any one of minimum travel time, minimum travel distance, and maximum use of high speed road segments.

4. The method of claim 1, wherein the step of searching includes:

determining if a travel distance to the destination intersection on the destination road segment is zero; and only if the distance is zero, excluding the destination road segment from the ordered set.

5. The method of claim 1, wherein the step of indicating includes displaying a map of the route.

6. The method of claim 1, wherein the step of indicating includes audibly announcing the route.

7. Apparatus for routing to a destination, comprising:

a memory storing information about a network of roads, each road including one or more road segments;

means for designating an intersection of at least two of the roads as the destination;

means for determining a starting location;

means for finding all of the road segments that connect to the designated intersection;

means for excluding from the found road segments any road segments not accessible from the designated intersection;

means for designating one of the remaining found road segments to be the destination road segment;

means for searching for the route on the network of road segments from the starting location to the destination road segment, the route thereby being an ordered set of the road segments; and means for indicating the route.

8. The apparatus of claim 7, wherein the stored information includes information as to whether any road segment is a one-way road segment, and wherein the means for excluding includes means for excluding any road segments that are one-way road segments on which travel is only permitted one way towards the designated intersection.

9. The apparatus of claim 7, wherein the means for searching further comprises means for selecting an optimum route in terms of a parameter based on any of minimum travel time, minimum travel distance, and maximum use of high speed road segments.

10. The apparatus of claim 7, wherein means for searching includes:

means for determining if a travel distance to the destination intersection on the destination road segment is zero; and means for excluding the destination road segment from the ordered set, only if the distance is zero.

11. The apparatus of claim 7, wherein the means for indicating includes a display of a map of the route.

12. The apparatus of claim 7, wherein the means for indicating includes means for audibly announcing the route.

13. A method for routing to a destination, based on stored information about a network of roads, each road including one or more road segments, comprising the steps of:

designating an intersection of at least two of the roads as the destination;

determining a starting location;

searching for a route on the network of road segments from the starting location to the destination intersection, the route thereby being an ordered set of the road segments;

determining if a distance to the destination intersection on a last road segment in the ordered set is zero;

only if the distance is zero, excluding the last road segment from the ordered set; and indicating the route as being the ordered set of road segments, excluding the excluded road segment.

14. The method of claim 13, wherein the step of searching comprises selecting an optimum route in terms of a travel parameter.

15. The method of claim 13, wherein the step of indicating includes displaying a map of the route.

16. The method of claim 13, wherein the step of indicating includes audibly announcing the route.

17. Apparatus for routing to a destination, comprising:

a memory storing information about a network of roads, each road including one or more road segments;

means for designating an intersection of at least two of the roads as the destination;

means for determining a starting location;

means for searching for a route on the network of road segments from the starting location to the destination intersection, the route thereby being an ordered set of the road segments;

means for determining if a distance to the destination intersection on a last road segment in the ordered set is zero;

means for excluding the last road segment from the ordered set only if the distance is zero; and means for indicating the route as being the ordered set of road segments, excluding the excluded road segment.

18. The apparatus of claim 17, wherein the means for searching comprises means for selecting an optimum route in terms of a travel parameter.

19. The apparatus of claim 17, wherein the means for indicating includes a display of a map of route.

20. The apparatus of claim 17, wherein the means for displaying includes means for audibly announcing the route.

* * * * *